2 Sheets—Sheet 1.

H. ROOT.

CABLE RAILWAY.

No. 10,621. Reissued July 7, 1885.

Attest:
Walter Middleton
F. L. Middleton

Inventor
Henry Root
by Ellis Spear
Att'ys.

BELL BROS., PHOTO-LITHOGRAPHERS, WASHINGTON, D.C.

2 Sheets—Sheet 2.
H. ROOT.
CABLE RAILWAY.
No. 10,621. Reissued July 7, 1885.
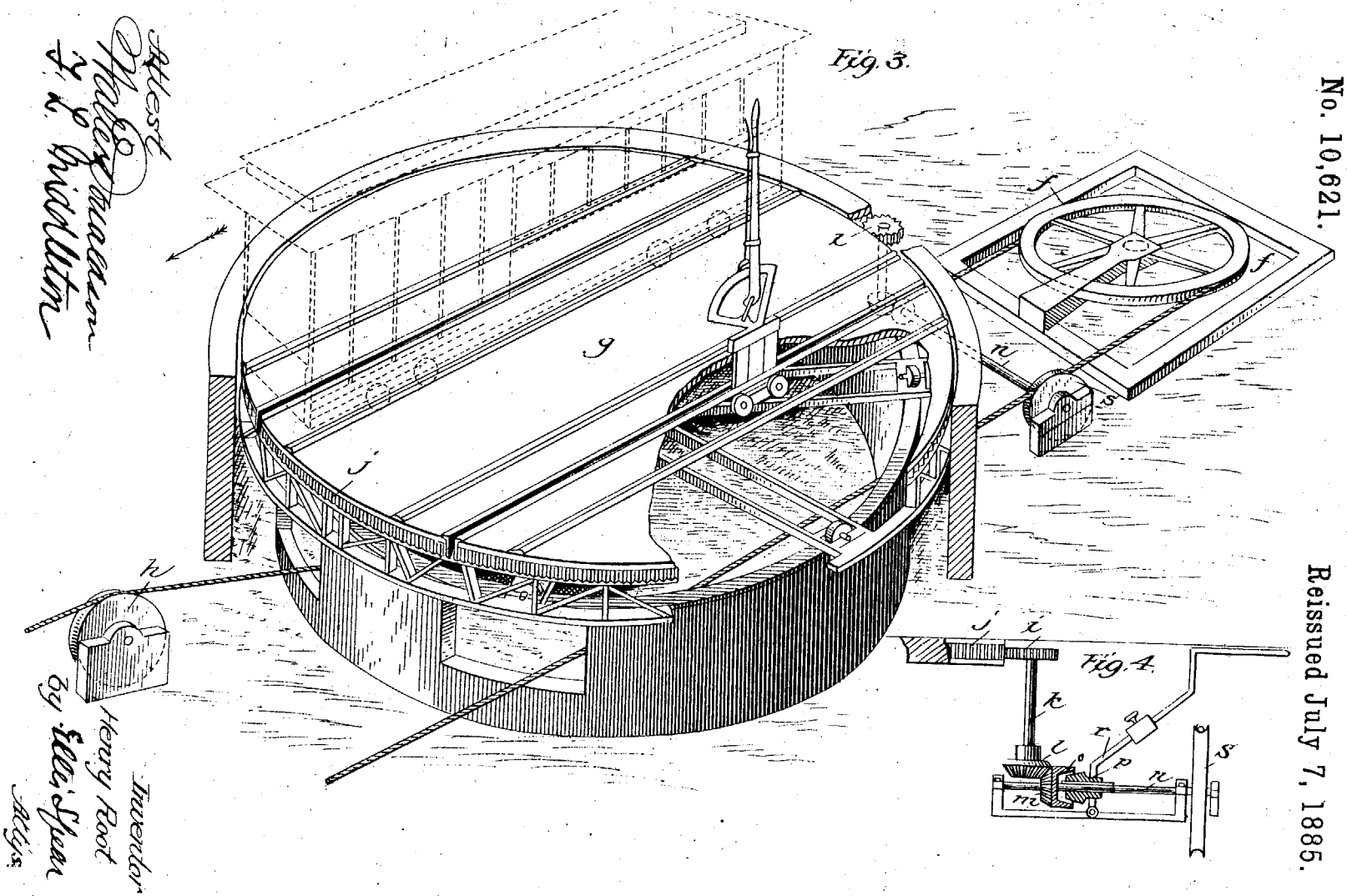
Attest
Walter Dawson
F. L. Middleton
Inventor
Henry Root
by Ellis Spear
Atty's.
BELL BROS., PHOTO-LITHOGRAPHERS, WASHINGTON, D.C.

UNITED STATES PATENT OFFICE.

HENRY ROOT, OF SAN FRANCISCO, CALIFORNIA.

CABLE RAILWAY.

SPECIFICATION forming part of Reissued Letters Patent No. 10,621, dated July 7, 1885.

Original No. 315,992, dated April 14, 1885. Application for reissue filed June 11, 1885.

*To all whom it may concern*

Be it known that I, HENRY ROOT, of the city and county of San Francisco, and State of California, have invented an Improvement in Cable Railways; and I hereby declare the following to be a full, clear, and exact description thereof.

My invention relates to certain improvements in cable railways; and it consists in an improvement in the terminal mechanism of the line with a means for turning and transferring the cars from the incoming to the outgoing line of track, the whole forming a part of the permanent way, and means by which it is operated, as will be more fully explained by reference to the accompanying drawings, in which—

Figure 1:
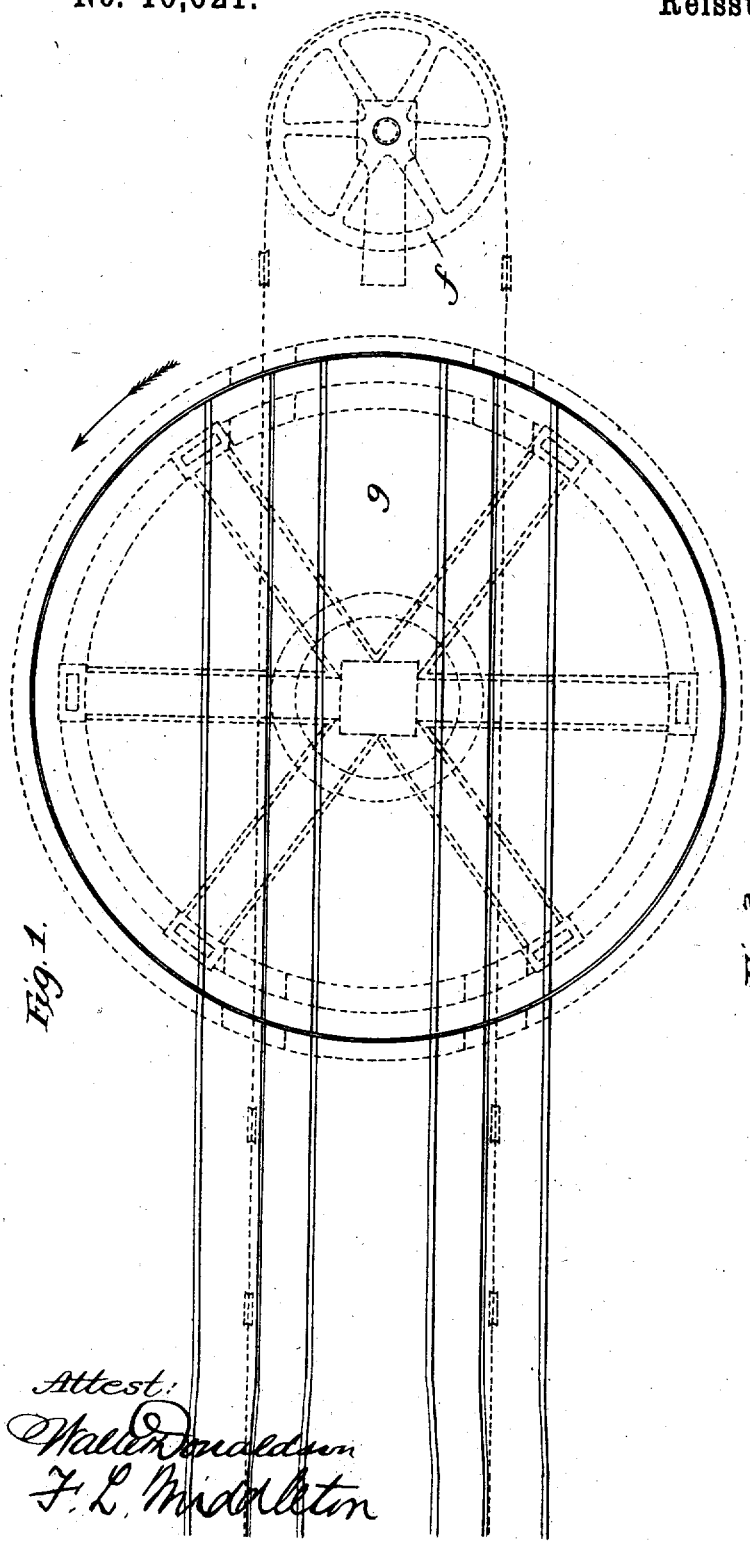
Figure 2:
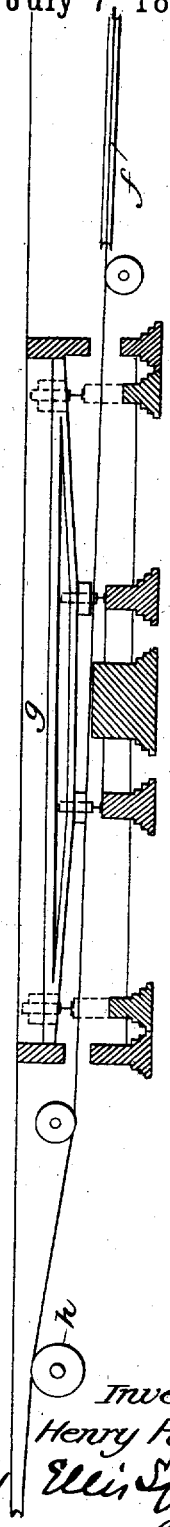

Figure 1 is a plan of terminal mechanism. Fig. 2 is a vertical section of same. Fig. 3 is a perspective view of the terminal mechanism. Fig. 4 is a section showing the driving-gear, clutch mechanism, and operating-lever.

At the terminus of the road the cable passes around a large horizontal pulley, *f*, the diameter of which is such that the cable, which passes down the center of one track, will, after passing around the pulley, return up the center of the other track. The cable-tubes terminate before the pulley *f* is reached, and a large horizontal circular table, *g*, is supported so that it may travel upon wheels or rollers around a central post or spindle. Upon this table are two parallel lines of rails, which, when the table is in a certain position, coincide with the two lines of the main tracks; or, by turning the table, they may be made to coincide with tracks which approach it in lines other than parallel. The car may thus run in upon one track from the incoming line, and, after the table has been turned around, it may go out upon the other line, having itself been turned in the movement. The table is slotted between the lines of rails to allow the grip-shank to pass in. The cable is dropped from the grip at a short distance from the table, and the car may be allowed to run the remainder of the distance upon the table by its acquired momentum, the cable passing through to the pulley *f* beneath the table. The return-cable is raised to a height where the grip may again engage it after the car has left the table by a permanent vertical pulley, *h*, a short distance from the table.

The table is rotated by means of a small pinion or roughened friction-wheel, *i*, which engages a similar gear or frictional surface, *j*, upon the edge of the table, or suitably connected with it. The pinion is fixed to a vertical shaft, *k*, and this has a beveled wheel, *l*, upon its lower end, which engages a beveled wheel, *m*, upon the horizontal shaft *n*.

A conical cup, *o*, is cast upon the back of the beveled wheel *m*, the two being loose upon the shaft, which turns freely within the wheel. When the bevel-wheel *m* is to be set in motion it is done by means of a cone, *p*, which slides upon a feather on the shaft, and is operated by a lever, *r*, which forces it into or withdraws it from the cup, and thus communicates motion to the table.

The shaft *n* has a pulley, *s*, fixed at its outer end, and this pulley is so placed that the cable running in contact with it provides the power to turn the table. It is apparent that this turning device is applicable to any apparatus having one or more turn-tables and an endless traveling cable, regardless of the arrangement of the tracks.

Having thus described my invention, what I claim as new, and desire to secure by Letters Patent, is—

1. The combination of a turn-table, a traveling cable, and gearing operated by said cable, whereby the turn-table is rotated.

2. The means for turning cars and transferring them from one track to the other, consisting of a horizontal table with parallel tracks and slots for the passage of the grip-shanks, and gears or frictional wheels, and a clutch or means by which they may be thrown out of or into contact, substantially as herein described.

3. A means for turning cars and transferring them from one track to another, consisting of a horizontal table with parallel tracks, and slots for the passage of the grip-shanks equidistant from the center of rotation, a peripheral gear or frictional surface, and a wheel running in contact therewith, and shafts and gearing by which motion may be transmitted thereto, a clutch mechanism to engage or disengage the driving-shaft, and a pulley upon said shaft upon which the main cable acts to drive it, substantially as herein described.

In witness whereof I have hereunto set my hand.

HENRY ROOT.

Witnesses:
S. H. NOURSE,
H. C. LEE.